United States Patent
Chen et al.

(10) Patent No.: US 8,708,730 B2
(45) Date of Patent: Apr. 29, 2014

(54) WIRELESS INTERNET DEVICE

(71) Applicant: Huawei Device Co., Ltd., Shenzhen (CN)

(72) Inventors: Pengsheng Chen, Wuhan (CN); Jianjun Xiao, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/693,522

(22) Filed: Dec. 4, 2012

(65) Prior Publication Data

US 2013/0089998 A1   Apr. 11, 2013

Related U.S. Application Data

(63) Continuation of application No. PCT/CN2011/076181, filed on Jun. 23, 2011.

(30) Foreign Application Priority Data

Jun. 24, 2010   (CN) .................... 2010 2 0241411 U

(51) Int. Cl.
*H01R 13/62* (2006.01)

(52) U.S. Cl.
USPC .......................................... 439/331

(58) Field of Classification Search
USPC ............... 439/331, 64, 26, 328, 928.1, 630, 439/159–160, 638, 910, 325–326, 377
See application file for complete search history.

(56) References Cited

U.S. PATENT DOCUMENTS

| 7,125,258 B2 * | 10/2006 | Nakakubo et al. ........... 439/64 |
| 7,794,250 B2 * | 9/2010 | Imamura ...................... 439/159 |
| 2005/0136744 A1 * | 6/2005 | Kato et al. .................. 439/630 |
| 2009/0207570 A1 | 8/2009 | Katou et al. |

FOREIGN PATENT DOCUMENTS

| CN | 201167329 | 12/2008 |
| CN | 201242759 | 5/2009 |
| CN | 201700003 | 1/2011 |
| EP | 2 093 979 A1 | 2/2008 |
| GB | 2377309 | 1/2003 |
| JP | 2002-298092 | 10/2002 |
| WO | WO 00/68770 A1 | 11/2000 |

OTHER PUBLICATIONS

International Search Report of Corresponding PCT Application PCT/CN2011/076181 mailed Oct. 13, 2011.
International Search Report issued Oct. 13, 2011 in corresponding International Patent Application No. PCT/CN2011/076181.

(Continued)

*Primary Examiner* — Edwin A. Leon
(74) *Attorney, Agent, or Firm* — Staas & Halsey LLP

(57) ABSTRACT

Embodiments of the present invention disclose a wireless Internet device. The wireless Internet device includes a device body (1) with an accommodation space, a connection interface (2) set in the accommodation space, and a subscriber identity module (SIM) card holder (3) configured to install a SIM card, where a push-locking apparatus (4, 5) is also set in the accommodation space; the push-locking apparatus (4, 5) includes a push part (41, 51) and a locking part (42, 52); the push part (41, 51) is connected to the locking part (42, 52). The solution provided in the embodiments of the present invention can achieve a purpose that the SIM card holder (3) cannot be randomly plugged in and out when the wireless Internet device works.

8 Claims, 5 Drawing Sheets

(56) References Cited

OTHER PUBLICATIONS

Written Opinion of the International Searching Authority issued Oct. 13, 2011 in corresponding International Patent Application No. PCT/CN2011/076181.

Extended European Search Report mailed Jun. 28, 2013 in corresponding European Patent Application No. 11797624.1-1855 PCT/CN2011076181 (6 pages).

* cited by examiner

WIRELESS INTERNET DEVICE

CROSS-REFERENCE TO RELATED APPLICATIONS

This application is a continuation of International Application No. PCT/CN2011/076181, filed on Jun. 23, 2011, which claims priority to Chinese Patent Application No. 201020241411.7, filed on Jun. 24, 2010, both of which are hereby incorporated by reference in their entireties.

FIELD OF THE INVENTION

The embodiments of the present invention relates to the field of communications technologies, and in particular, to a wireless Internet device.

BACKGROUND OF THE INVENTION

A wireless Internet device is a mobile broadband access terminal device, such as a data card and a mobile wireless hotspot device. At present, a computer, especially a personal computer (Personal Computer, hereinafter referred to as PC) may realize wireless access to networks, such as an enhanced data rate for GSM evolution technology (Enhanced Data Rate for GSM Evolution, hereinafter referred to as Edge), code division multiple access (Code Division Multiple Access, hereinafter referred to as CDMA), a universal mobile telecommunications system (Universal Mobile Telecommunications System, hereinafter referred to as UMTS), a high speed packet access technology (High Speed Packet Access, hereinafter referred to as HSPA), HSPA+, and long term evolution (Long Term Evolution, hereinafter referred to as LTE), through a universal serial bus (Universal Serial BUS, hereinafter referred to as USB) data card. The wireless access manner enables accessing the Internet, browsing a web-page, receiving/sending emails and so on to be free from the limitation of a network cable, which provides great convenience for the mobile office of a subscriber.

The wireless Internet device may be connected to the Internet by using a subscriber identity module (Subscriber Identity Module, hereinafter referred to as SIM card) at any place in the coverage of wireless telephone signals. The SIM card is installed in a SIM card holder of the wireless Internet device to achieve a communication connection with a USB wireless Internet device.

During a process of implementing the present invention, the inventor finds that the prior art at least has the following technical defects: the SIM card holder of the wireless Internet device in the prior art can be randomly plugged in and out, so that an accidental network interruption easily happens to the wireless Internet device in a usage process.

SUMMARY OF THE INVENTION

Embodiments of the present invention provide a wireless Internet device which is used for solving defects in the prior art, achieving an objective that a SIM card holder cannot be randomly plugged in and out when the wireless Internet device works, and ensuring that an accidental network interruption caused by randomly plugging in and out the SIM card holder does not happen to the wireless Internet device in a usage process.

The embodiments of the present invention provide a wireless Internet device, including a device body with an accommodation space, a connection interface set in the accommodation space, and a SIM card holder configured to install a SIM card, where a push-locking apparatus is also set in the accommodation space; the push-locking apparatus includes a push part and a locking part; and the push part is connected to the locking part; and the push part slides along the device body, the locking part releases the SIM card holder in a state that the push part slides to block an external side of the connection interface, and the locking part locks the SIM card holder in a state that the push part slides to expose the external side of the connection interface.

As for the wireless Internet device in the foregoing description, the push-locking apparatus is a push rod set along an edge of the device body, two ends of the push rod are the push part and the locking part, respectively, the push part is set outside the device body, and the locking part is set inside the accommodation space.

As for the wireless Internet device in the foregoing description, an end part of the locking part is a boss engaging with a recess set on the SIM card holder.

As for the wireless Internet device in the foregoing description, the push part is a push rod set along an edge of the device body, a first end of the push rod is set outside the device body, and a second end of the push rod is set inside the accommodation space; the second end of the push rod is connected to a T-shaped boss, and the T-shaped boss includes a support part perpendicular to the push rod and a platform part set in a direction the same as an extending direction of the push rod; and in the extending direction of the push rod, perpendicular distances from two ends of the platform part to the push rod are unequal; and the locking part includes a slide part with the recess, and the boss connected to the slide part and configured to engage with the SIM card holder; and the recess of the slide part is used in cooperation with the T-shaped boss.

As for the wireless Internet device in the foregoing description, a bottom surface of the recess of the slide part and an upper surface of the platform part are correspondingly set slopes.

As for the wireless Internet device in the foregoing description, the recess is a dovetail groove.

As for the wireless Internet device in the foregoing description, guide rails providing rails for the slide of the slide part are also set in the internal portion of the device body and at two sides of the slide part.

As for the wireless Internet device in the foregoing description, the wireless Internet device is a USB data card.

The wireless Internet device provided in the embodiments of the present invention, through the push-locking apparatus including the push part and the locking part, the push part may slide along a body of the wireless Internet device, the locking part releases the SIM card holder in the state that the push part slides to block the external side of the connection interface of the wireless Internet device; and the locking part locks the SIM card holder in the state that the push part slides to expose the external side of the connection interface. The SIM card holder is locked and cannot be randomly plugged in and out when the wireless Internet device works, so that the network requirement for normal working of the wireless Internet device is ensured.

BRIEF DESCRIPTION OF THE DRAWINGS

To illustrate the technical solutions in the embodiments of the present invention or in the prior art more clearly, the accompanying drawings required for describing the embodiments or the prior art are introduced briefly in the following. Apparently, the accompanying drawings in the following description are some embodiments of the present invention, and persons of ordinary skill in the art can further derive other drawings according to the accompanying drawings without creative efforts.

DETAILED DESCRIPTION OF THE EMBODIMENTS

In order to make the objectives, technical solutions, and advantages of the embodiments of the present invention clearer, the technical solutions in the embodiments of the present invention are clearly and completely described in the following with reference to the accompanying drawings in the embodiments of the present invention. Apparently, the described embodiments are a part of the embodiments rather than all of the embodiments of the present invention. All other embodiments obtained by persons skilled in the art based on the embodiments in the present invention without creative efforts shall fall within the protection scope of the present invention.

Figure 1:
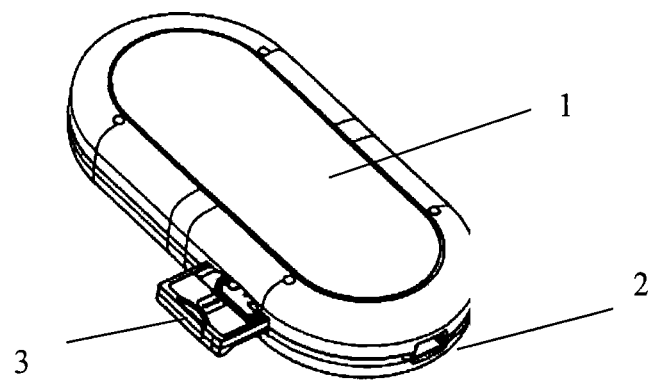
FIG. 1 is a schematic structural diagram of a wireless Internet device according to the prior art.

FIG. 1 is a schematic structural diagram of a wireless Internet device according to the prior art, and as shown in FIG. 1, the wireless Internet device includes a device body 1 with an accommodation space, a connection interface 2 set in the accommodation space, and a SIM card holder 3 configured to install a SIM card.

An embodiment of the present invention provides a wireless Internet device, and in the embodiment, a USB data card is taken as an example as the wireless Internet device for illustration, but it is not used to limit the protection scope. Based on the wireless Internet device shown in FIG. 1, the wireless Internet device may further includes a push-locking apparatus set in the accommodation space, and the push-locking apparatus includes a push part configured to trigger the push-locking apparatus to move, and a locking part configured to perform position limitation on the SIM card holder 3. The push part may slide along a body of the wireless Internet device, the SIM card holder 3 is released by the locking part when the push part slides to block an external side of the connection interface 2, and the SIM card holder 3 is locked by the locking part when the push part slides to expose the external side of the connection interface 2.

The external side of the connection interface 2 here is set as a side of the connection interface 2 facing outwards (not the device body 1) and configured to connect to another object.

It should be further noted that the SIM card holder 3 released by the locking part may be understood as no physical connection relationship exists between the locking part and the SIM card holder 3, and when the SIM card holder 3 is released by the locking part, the SIM card holder 3 may be randomly plugged into or pulled out of the device body 1; while the SIM card holder 3 locked by the locking part may be understood as a physical connection relationship exists between the locking part and the SIM card holder 3, which may be in a form such as that the locking part engages into a notch on the SIM card holder 3, so that the locking part applies a limitation effect to the movement of the SIM card holder 3, and the SIM card holder 3 cannot be moved and cannot be randomly plugged into or pulled out of the device body 1 when the SIM card holder 3 is locked by the locking part.

For the wireless Internet device provided in the embodiment of the present invention, by the push-locking apparatus including the push part and the locking part, the push part may slide along the body of the wireless Internet device, the SIM card holder is released by the locking part in a state that the push part slides to block an external side of the connection interface of the wireless Internet device; and the SIM card holder is locked by the locking part in a state that the push part slides to expose the external side of the connection interface. The SIM card holder is locked and cannot be randomly plugged in and out when the wireless Internet device works, so that the network requirement for normal working of the wireless Internet device is ensured.

Figure 2:
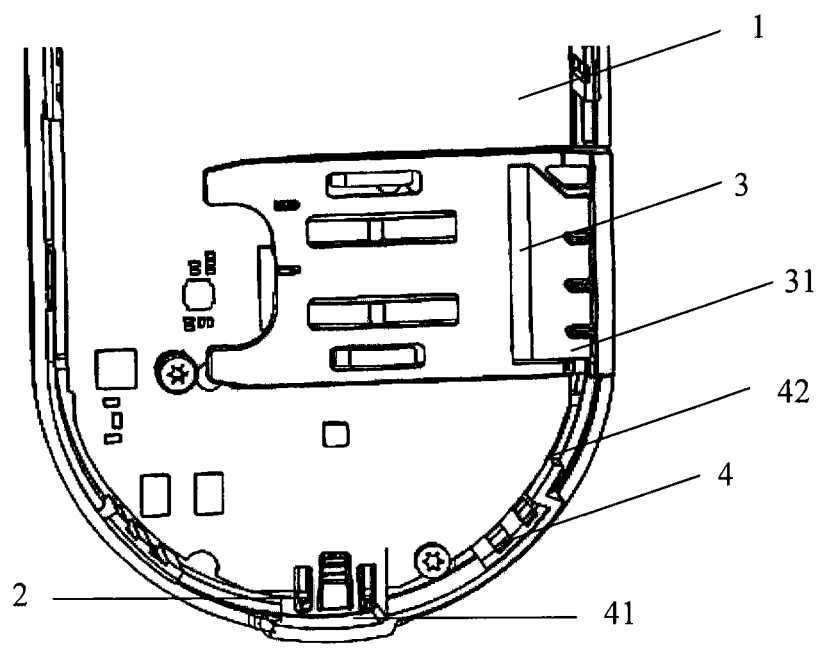
FIG. 2 is an internal schematic structural diagram of a wireless Internet device according to a first embodiment of the present invention.

As for the wireless Internet device in the foregoing description, FIG. 2 is an internal schematic structural diagram of a wireless Internet device according to an embodiment of the present invention, and as shown in FIG. 2, a push-locking apparatus of the wireless Internet device is a push rod 4 set along an edge of a device body 1, and two ends of the push rod 4 are a push part 41 and a locking part 42, respectively. An end part of the locking part 42 is a boss that engages with a recess 31 set on a SIM card holder 3 in a usage state.

Figure 3:
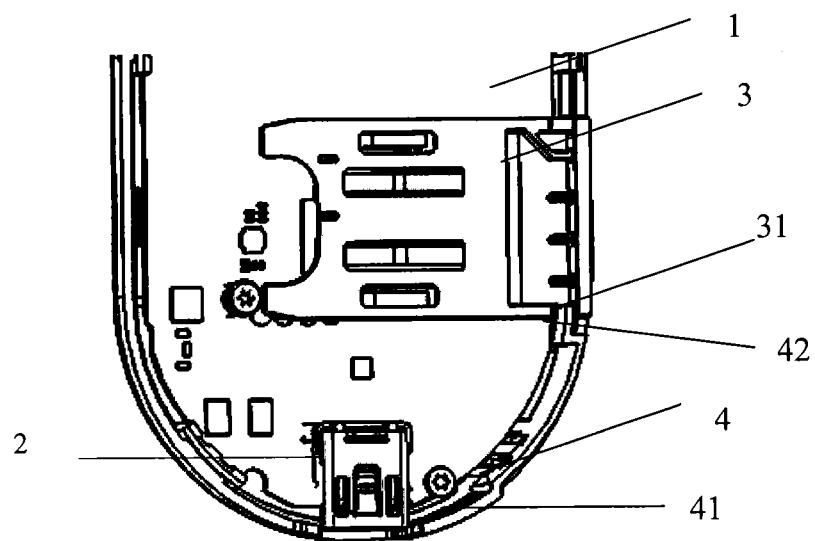
FIG. 3 is an internal schematic structural diagram of a wireless Internet device according to a first embodiment of the present invention.

When the wireless Internet device provided in the embodiment is not in a usage state, it may be understood as that when a connection interface 2 is not connected to another object, the push part 41 of the push-locking apparatus blocks on the connection interface 2, the recess 31 on the SIM card holder 3 is released by the locking part 42, and in this case, the SIM card holder 3 is in a state capable of being randomly plugged in and out. When the wireless Internet device is in a usage state, that is, the connection interface 2 is connected to another object, as shown in FIG. 3, FIG. 3 is an internal schematic structural diagram of the wireless Internet device according to a first embodiment of the present invention, the push part 41 of the push-locking apparatus slides to expose an external side of the connection interface 2, so that the connection interface 2 may be used in connection with a USB male connector, and the push part 41 of the push-locking apparatus cannot return to its position due to the blocking of the USB male connector; and the locking part 42 of the push-locking apparatus is linked with the push part 41, so that the locking part 42 is plugged into the recess 31 of the SIM card holder 3 under the effect of the push part 41 to lock the SIM card holder 3, and therefore, the SIM card holder 3 is locked and cannot be pulled out.

For the wireless Internet device provided in the embodiment, by the push-locking apparatus including the push part and the locking part, the push part may slide along the body of the wireless Internet device, the SIM card holder is released by the locking part in a state that the push part slides to block an external side of the connection interface of the wireless Internet device; and the SIM card holder is locked by the locking part in a state that the push part slides to expose the external side of the connection interface. The SIM card holder is locked and cannot be randomly plugged in and out when the wireless Internet device works, so that the network requirement for normal working of the wireless Internet device is ensured.

Figure 4:
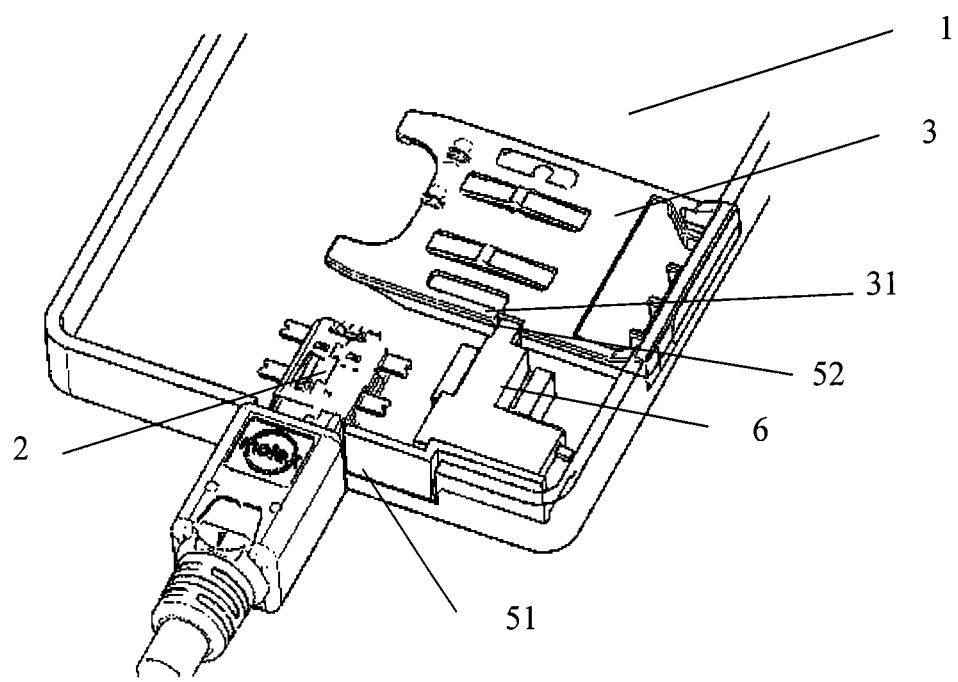
FIG. 4 is an internal schematic structural diagram of a wireless Internet device according to a second embodiment of the present invention.

As for the wireless Internet device in the foregoing description, FIG. 4 is an internal schematic structural diagram of a wireless Internet device according to an embodiment of the present invention, and as shown in FIG. 4, the wireless Internet device may further includes a push-locking apparatus set in an accommodation space, and the push-locking apparatus includes a push part 51 configured to trigger the push-locking apparatus to move, and a locking part 52 configured to perform position limitation on a SIM card holder 3.

Figure 5:
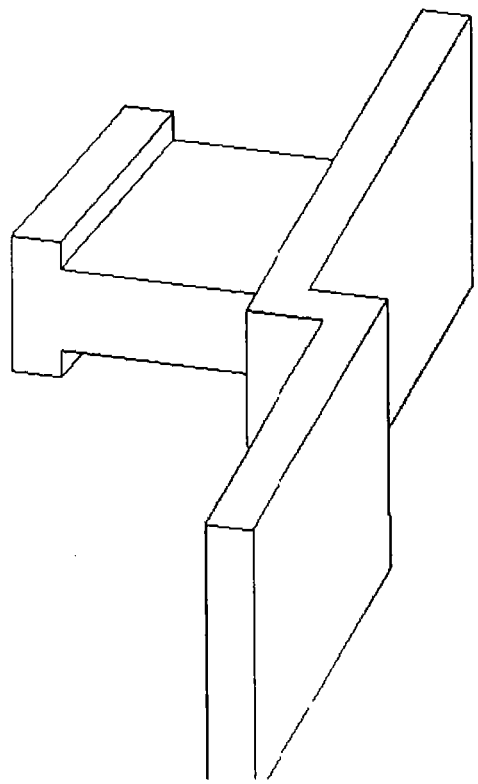
FIG. 5 is a schematic diagram of a push part of a push-locking apparatus according to a second embodiment of the present invention.
Figure 6:
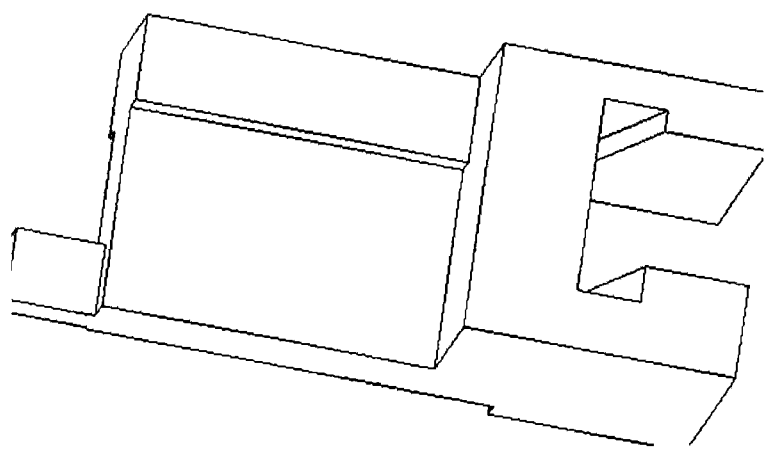
FIG. 6 is a schematic diagram of a locking part of a push-locking apparatus according to a second embodiment of the present invention.
Figure 7:
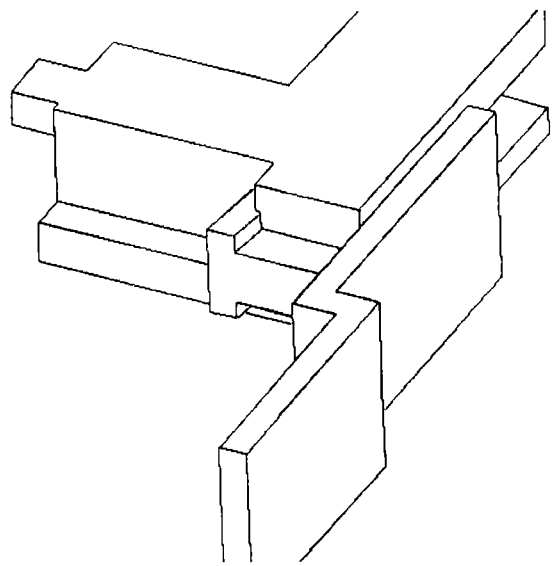
FIG. 7 is a schematic diagram of a cooperative use between a T-shaped boss and a dovetail groove according to a second embodiment of the present invention.
Figure 8:
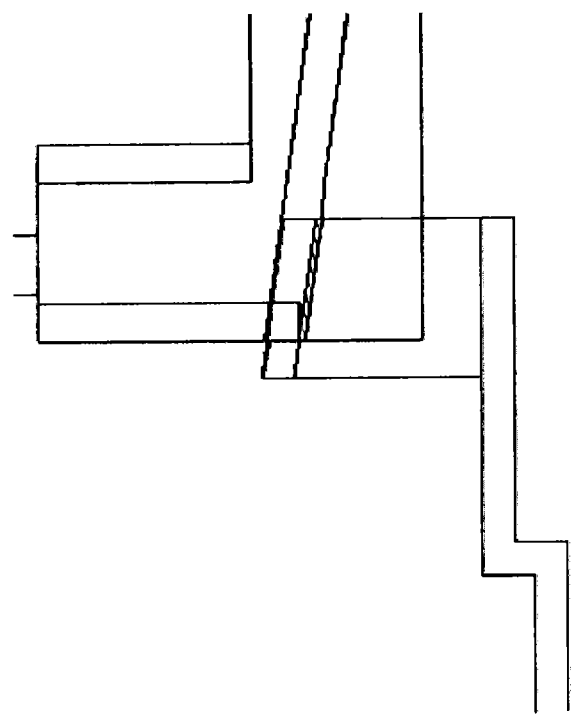
FIG. 8 is a schematic diagram of a cooperative use between a T-shaped boss and a dovetail groove according to a second embodiment of the present invention.

FIG. 5 is a schematic diagram of the push part of the push-locking apparatus according to an embodiment of the present invention. As for the push part 51 shown in FIG. 5, the push part 51 is a push rod, a first end of the push rod is set outside a device body 1, and a second end of the push rod is set inside the accommodation space; the second end of the push rod is connected to a T-shaped boss, and the T-shaped boss includes a support part perpendicular to the push rod and a platform part set in a direction the same as an extending direction of the push rod; and in the extending direction of the push rod, perpendicular distances from two ends of the platform part to the push rod are unequal. FIG. 6 is a schematic diagram of the locking part of the push-locking apparatus according to an embodiment of the present invention. As for the locking part 52 shown in FIG. 6, the locking part 52 includes a slide part with a recess, and a boss connected to the slide part and configured to engage with the SIM card holder 3. FIG. 7 is a schematic diagram of a cooperative use between the T-shaped boss and a dovetail groove according to the embodiment of the present invention. As shown in FIG. 7, the recess of the slide part is used in cooperation with the T-shaped boss. Accordingly, FIG. 8 is a schematic diagram of the cooperative use between the T-shaped boss and the dovetail groove according to the embodiment of the present invention. As shown in FIG. 8, a bottom surface of the recess of the slide part and an upper surface of the platform part are correspondingly set slopes.

As for the wireless Internet device in the foregoing description, the recess of the slide part may be a dovetail groove.

As for the wireless Internet device in the foregoing description, guide rails 6 providing rails for the slide of the slide part are set in the internal portion of the device body 1 and at two sides of the slide part.

Figure 9:
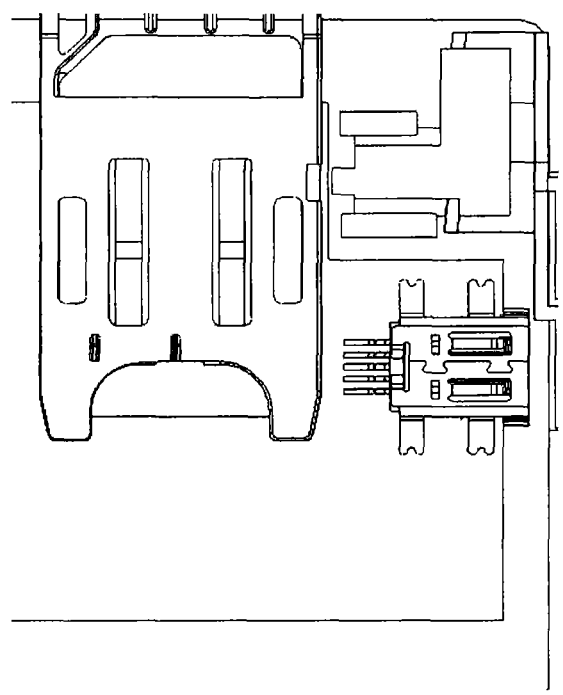
FIG. 9 is an internal schematic structural diagram of a wireless Internet device according to a second embodiment of the present invention.
Figure 10:
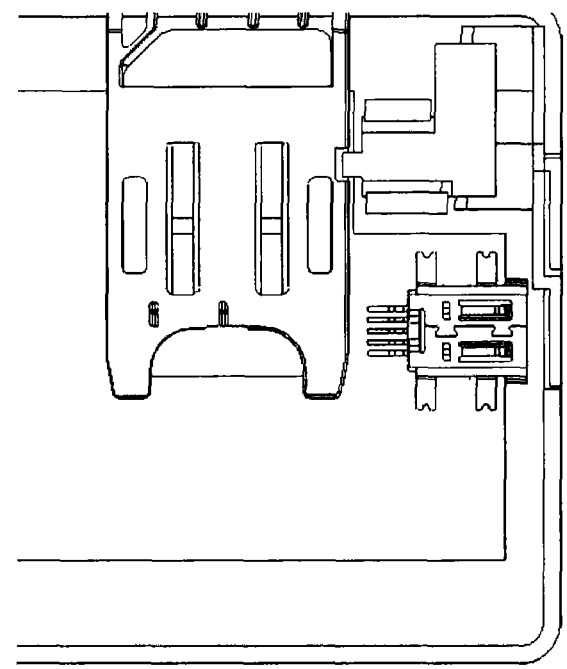
FIG. 10 is an internal schematic structural diagram of a wireless Internet device according to a second embodiment of the present invention.

FIG. 9 is an internal schematic structural diagram of the wireless Internet device according to the embodiment of the present invention, as shown in FIG. 9, when the wireless Internet device provided in the embodiment is not in the usage state, the push part 51 of the push-locking apparatus blocks on the USB connection interface 2, the recess on the SIM card holder 3 is released by the locking part 52, and in this case, the SIM card holder 3 is in a state capable of being randomly plugged in and out. FIG. 10 is an internal schematic structural diagram of the wireless Internet device according to the embodiment of the present invention, as shown in FIG. 10, when the wireless Internet device is in the usage state, the push part 51 of the push-locking apparatus is far away from the connection interface 2, so that the connection interface 2 may be used in connection with a USB male connector, and the push part 51 of the push-locking apparatus cannot return to its position due to the blocking of the USB male connector; the dovetail groove of the locking part 52 is moved in a direction of the recess of the SIM card holder 3 under the effect of a support force provided by the upper surface of the platform part of the T-shaped boss of the push part 51, so that the locking part 52 is plugged into the recess of the SIM card holder 3 under the effect of the push part 51 to lock the SIM card holder 3, and therefore, the SIM card holder 3 is locked and cannot be pulled out. Due to the limitation of the guide rails 6, the locking part 52 can be precisely plugged into the recess of the SIM card holder 3 without large swing and offset.

In the foregoing invention embodiments, the wireless Internet device may be a USB data card, that is, a USB wireless modem.

For the wireless Internet device provided in the embodiment, by the push-locking apparatus including the push part and the locking part, the push part may slide along the body of the wireless Internet device, the SIM card holder is released by the locking part in the state that the push part slides to block the external side of the connection interface of the wireless Internet device; and the SIM card holder is locked by the locking part in the state that the push part slides to expose the external side of the connection interface. The SIM card holder is locked and cannot be randomly plugged in and out when the wireless Internet device works, so that the network requirement for normal working of the wireless Internet device is ensured.

Finally, it should be noted that the foregoing embodiments are only used for describing the technical solution of the present invention and not intended to limit the present invention. Although the present invention is described in detail with reference to the foregoing embodiments, persons of ordinary skill in the art should understand that they can still make modifications to the technical solution recorded in each foregoing embodiment or make equivalent replacements to some technical features in the technical solution, and the modifications or replacements do not make the essence of the corresponding technical solution depart from the spirit and scope of the technical solution of each embodiment of the present invention.

What is claimed is:

1. A wireless Internet device, comprising a device body with an accommodation space, a connection interface set in the accommodation space, and a SIM card holder configured to install a SIM card, wherein a push-locking apparatus is also set in the accommodation space; the push-locking apparatus comprises a push part and a locking part; and the push part is connected to the locking part; and the push part slides along the device body, the locking part releases the SIM card holder in a state that the push part slides to block an external side of the connection interface, and the locking part locks the SIM card holder in a state that the push part slides to expose the external side of the connection interface.

2. The wireless Internet device according to claim 1, wherein the push-locking apparatus is a push rod set along an edge of the device body, two ends of the push rod are the push part and the locking part, respectively, the push part is set outside the device body, and the locking part is set inside the accommodation space.

3. The wireless Internet device according to claim 2, wherein an end part of the locking part is a boss engaging with a recess set on the SIM card holder.

4. The wireless Internet device according to claim 1, wherein the push part is a push rod set along an edge of the device body, a first end of the push rod is set outside the device body, and a second end of the push rod is set inside the accommodation space; the second end of the push rod is connected to a T-shaped boss, and the T-shaped boss comprises a support part perpendicular to the push rod and a platform part set in a direction the same as an extending direction of the push rod; and in the extending direction of the push rod, perpendicular distances from two ends of the platform part to the push rod are unequal; and the locking part comprises a slide part with a recess, and a boss connected to the slide part and configured to engage with the SIM card holder; and the recess of the slide part is used in cooperation with the T-shaped boss.

5. The wireless Internet device according to claim 4, wherein a bottom surface of the recess of the slide part and an upper surface of the platform part are correspondingly set slopes.

6. The wireless Internet device according to claim 5, wherein the recess is a dovetail groove.

7. The wireless Internet device according to claim 5, wherein guide rails providing rails for the slide of the slide part are also set in the internal portion of the device body and at two sides of the slide part.

8. The wireless Internet device according to claim 1, wherein the wireless Internet device is a USB data card.

\* \* \* \* \*

UNITED STATES PATENT AND TRADEMARK OFFICE
CERTIFICATE OF CORRECTION

PATENT NO. : 8,708,730 B2  Page 1 of 1
APPLICATION NO. : 13/693522
DATED : April 29, 2014
INVENTOR(S) : Pengsheng Chen et al.

It is certified that error appears in the above-identified patent and that said Letters Patent is hereby corrected as shown below:

On the Title Page, Item [30] (Foreign Application Priority Data):

Delete "2010 2 0241411 U" and insert --2010 2 0241411--

Signed and Sealed this
Second Day of June, 2015

Michelle K. Lee
*Director of the United States Patent and Trademark Office*